United States Patent [19]
Markandey et al.

[11] Patent Number: 5,748,250
[45] Date of Patent: May 5, 1998

[54] VIDEO DISPLAY SYSTEM WITH DIGITAL DE-INTERLACING

[75] Inventors: Vishal Markandey, Dallas; Robert J. Gove, Plano, both of Tex.

[73] Assignee: Texas Instruments Incorporated, Dallas, Tex.

[21] Appl. No.: 533,409

[22] Filed: Sep. 25, 1995

Related U.S. Application Data

[63] Continuation of Ser. No. 178,976, Jan. 7, 1994, abandoned.

[51] Int. Cl.$^6$ .................................................. H04N 7/01
[52] U.S. Cl. ........................................ 348/451; 348/452
[58] Field of Search .................................. 348/450, 451, 348/448, 452, 458, 699, 701, 911; H04N 7/01

[56] References Cited

U.S. PATENT DOCUMENTS

| | | | |
|---|---|---|---|
| 4,831,435 | 5/1989 | Song et al. | 348/448 |
| 4,941,045 | 7/1990 | Birch | 348/448 |
| 4,956,619 | 9/1990 | Hornbeck | 330/4.3 |
| 4,985,764 | 1/1991 | Sato | 348/448 |
| 5,032,899 | 7/1991 | Sato | 348/450 |
| 5,079,544 | 1/1992 | DeMond et al. | 340/701 |
| 5,093,721 | 3/1992 | Rabii | 348/448 |
| 5,233,385 | 8/1993 | Sampsell | 355/35 |
| 5,339,109 | 8/1994 | Hong | 348/448 |

FOREIGN PATENT DOCUMENTS

| | | |
|---|---|---|
| A-169527 | 1/1986 | European Pat. Off. |
| A-227190 | 7/1987 | European Pat. Off. |
| A-61-261982 | 4/1987 | Japan. |
| A-2114396 | 8/1983 | United Kingdom. |
| WO-A-91 04636 | 4/1991 | WIPO. |

OTHER PUBLICATIONS

"Signal Processing of HDTV", Proceedings of the Second International Workshop on Signal Processing of HDTV, L'Aquila, Italy, 29 Feb.–2 Mar. 1988.

M. Yugami, K. Ohara and A. Takeda, "EDTV With Scan-Line Video Processor", IEEE Transactions on Consumer Electronics, vol. 38, No. 3, Aug. 1992.

S. Naimpally, L. Johnson, T. Darby, R. Meyer, L. Phillips, J. Vantrease, "Integrated Digital IDTV Receiver With Features", IEEE Transactions on Consumer Electronics, vol. 34, No. 3, Aug. 1988.

*Primary Examiner*—John K. Peng
*Assistant Examiner*—Nathan J. Flynn
*Attorney, Agent, or Firm*—Julie L. Reed; James C. Kesterson; Richard L. Donaldson

[57] ABSTRACT

A line generator (31) for receiving fields of pixel data sampled from a video input signal and for generating additional lines of pixel data so that the display frames will have more lines than the fields. The line generator (31) has a motion detector (31a) that determines, on a pixel by pixel basis, whether some part of the current field is in motion. A motion signal from the motion detector (31a) is used to select between outputs of two or more pixel generators (31b, 31c). One of the pixel generators (31b) provides pixel values that are better suited for display when the image is not in motion. The other pixel generator (31c) provides pixel values that are better suited for display when the image is in motion.

20 Claims, 4 Drawing Sheets

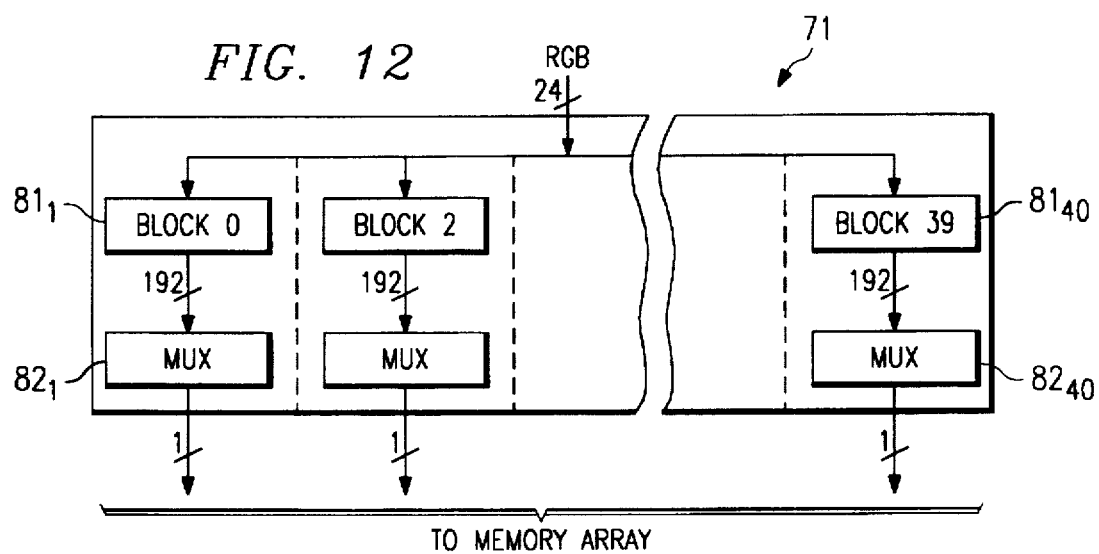
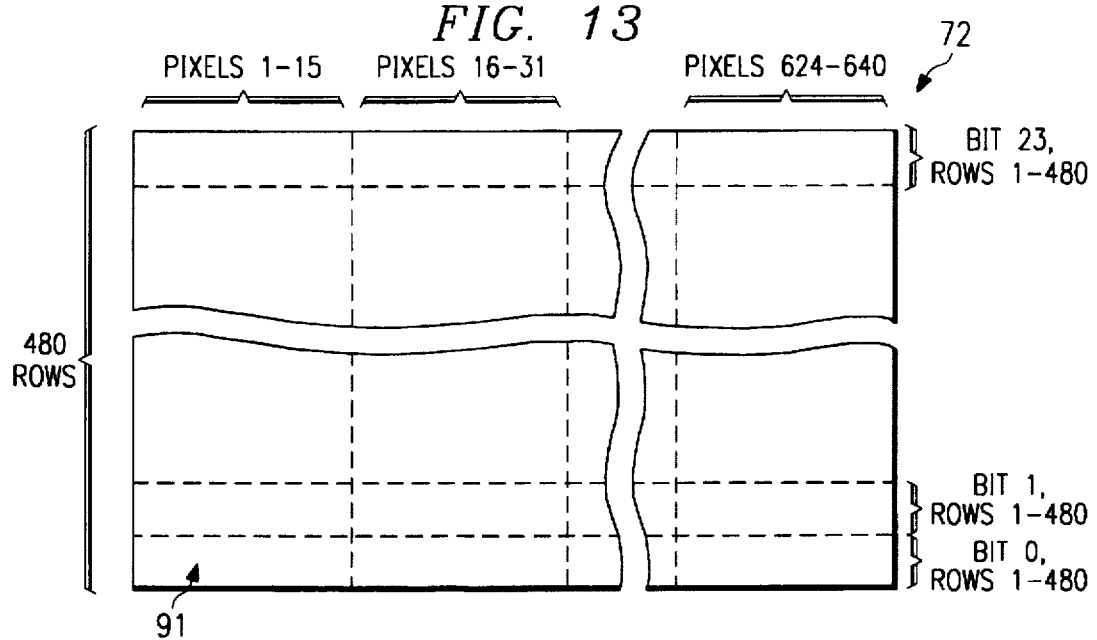
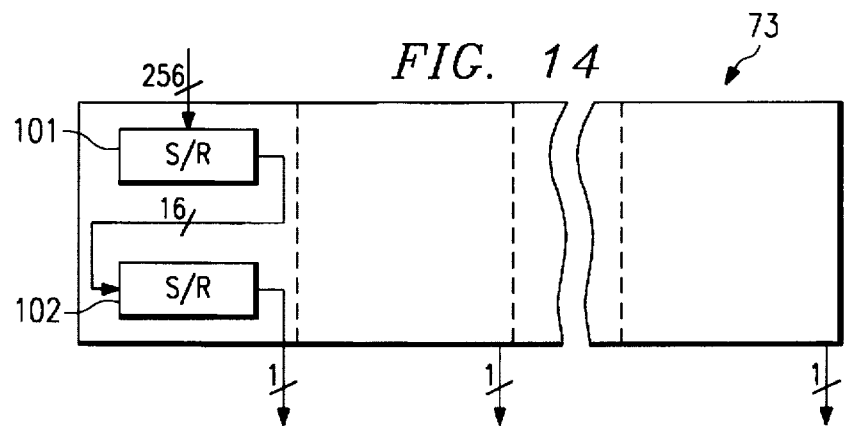

VIDEO DISPLAY SYSTEM WITH DIGITAL DE-INTERLACING

This application is a Continuation of application Ser. No. 08/178,976 filed on Jan. 7, 1994, now abandon.

TECHNICAL FIELD OF THE INVENTION

This invention relates to video display systems, and more particularly to de-interlacing an incoming video signal.

BACKGROUND OF THE INVENTION

Video display systems having digital processing capabilities permit greatly enhanced display images, as compared to conventional display systems that process the signal in analog form. One type of digital processing is "de-interlacing", which converts the 240-line fields of a standard NTSC television signal into 480-line frames, where the field rate and frame rate are the same.

Various de-interlacing techniques are known. The relative suitability of these techniques depends on the resulting image quality. When the image is in motion, some techniques are better suited than others.

SUMMARY OF THE INVENTION

One aspect of the invention is a line generator for a digital display system that receives fields of pixel data representing a video input signal and displays frames that have more lines than the fields. A typical application is for providing 480-line frames from the 240-line fields of an interlaced input signal. A motion detector determines a motion value by selecting at least one neighboring pixel of the current pixel, calculating a difference between values of the neighboring pixel in said current field and a second previous field, calculating a difference between values of the current pixel in a future field and a previous field, and calculating a weighted average of these differences. The resulting motion value indicates whether the current pixel is in motion. This process can be repeated for as many as all pixels in every field of incoming data. The motion value is used to select between the outputs of a first pixel generator that generates new pixel values from pixel data of said current field, and a second pixel generator that generates new pixel values from pixel data of at least one temporally adjacent field.

A technical advantage of the invention is that it provides an improved method of detecting whether an image, or part of an image, is in motion. Better motion detection results in better line generation processing, and hence better visual display.

BRIEF DESCRIPTION OF THE DRAWINGS

FIGS. 11–14 illustrate a display memory, such as the display memory of FIGS. 1 and 2, that includes circuitry for formatting pixel data into bit planes.

DETAILED DESCRIPTION OF THE INVENTION

Although this description is in terms of a display system having a spatial light modulator (digital) rather than a cathode ray tube (analog) as its display device, the invention can be implemented in any display system that digitally processes video data. Thus, in FIGS. 1 and 2, SLM 16 and optics 17 could be replaced with a digital to analog converter and a CRT.

Figure 1:
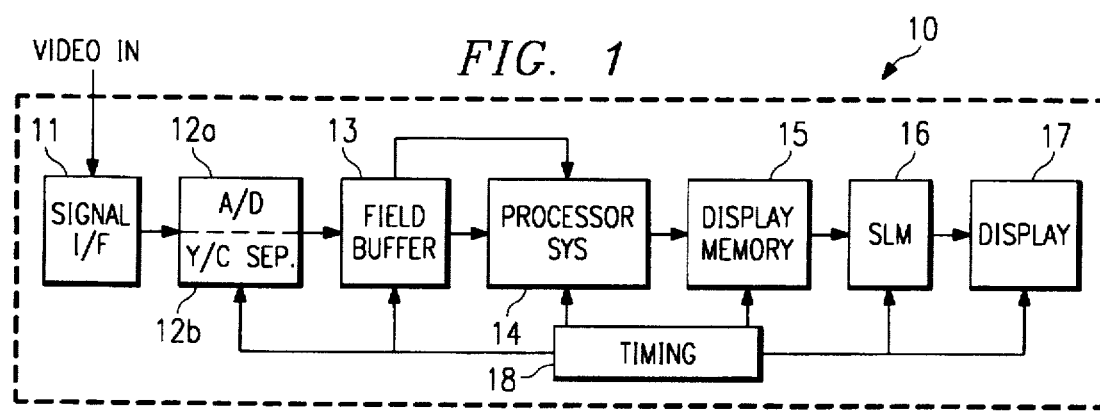
FIGS. 1 and 2 are block diagrams of display systems having processing systems that perform a line generation process in accordance with the invention.
Figure 2:
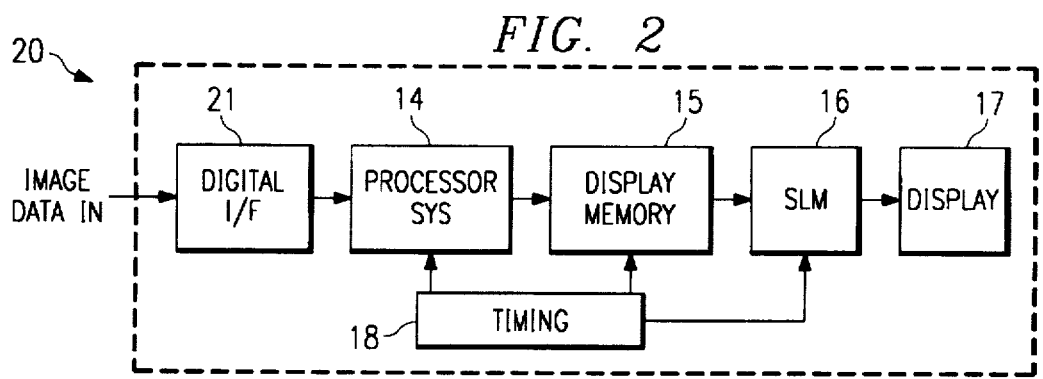

FIG. 1 is a block diagram of an SLM-based display system 10, which receives an analog video signal, such as a broadcast television signal, and which displays images represented by the signal. FIG. 2 is a block diagram of a similar system 20, in which the input signal already represents digital data. In both FIGS. 1 and 2, only those components significant to main-screen pixel data processing are shown. Other components, such as might be used for processing synchronization and audio signals or secondary screen features, such as closed captioning, are not shown.

A display frame having 640 pixels per row, 480 rows per frame, and 24 bits per pixel, sampled from an NTSC signal, is assumed. This is after a line generation process is performed by processing system 14, to convert interlaced fields having 240 odd-rows or 240 even-rows of data into display frames having 480 rows. There are 8 bits of data per pixel of each of three colors. However, the invention is useful with any type of video signal divided into fields by some sort of boundary, such as the vertical sync signal of the NTSC standard. Any signal such as this can be processed in accordance with the invention so as to generate display frames having additional lines of pixels, with the type of method used to generate the additional pixels being in response to a motion detection signal.

As an overview of the operation of display system 10, signal interface unit 11 receives an analog video signal and separates video, synchronization, and audio signals. It delivers the video signal to A/D converter 12a and Y/C separator 12b, which convert the data into pixel-data samples and separate the luminance ("Y") data from the chrominance ("C") data. In FIG. 1, the signal is converted to digital data before Y/C separation, but in other embodiments, Y/C separation could be performed before A/D conversion, using analog filters.

A field buffer 13 is interposed between Y/C separator 12b and processor 14. As explained below in connection with FIG. 3, field buffer 13 has a capacity of at least three fields of pixel data, so as to supply field-delayed pixel data for line generation. Field buffer 13 is also useful for field spreading. Because the SLM-based system 10 does not require vertical blanking time, the extra time between fields may be used to increase the time available for processing data and for loading data to SLM 16. Field buffer 13 may have other functions related to color wheel synchronization and scaling. Processor system 14 prepares the data for display by performing various pixel data processing tasks. Processor system 14 may include processing memory for storing pixel data during processing and for storing instructions. As explained below in connection with FIGS. 3–10, the tasks performed by processor system 14 include generating additional lines of pixel data to convert incoming fields of data to display frames, such as for de-interlacing purposes.

Display memory 15 receives processed pixel data from processor system 14. As explained below in connection with FIGS. 11–14, for use with an SLM 16, display memory 15 formats the data, on input or on output, into "bit-plane" format. The bit-plane format permits each pixel element of SLM 16 to be turned on or off in response to the value of each bit of data. In a typical display system 10, display memory 15 is a "double buffer" memory, which means that it has a capacity for at least two display frames. The buffer for one display frame can be read out to SLM 16 while the buffer another display frame is being written. The two buffers are controlled in a "ping-pong" manner so that data is continuously available to SLM 16.

SLM 16 may be any type of SLM. Although this description is in terms of a DMD-type of SLIM 16, other types of SLMs could be substituted into display system 10 and used for the invention described herein. For example, SLM 16 could be an LCD-type SLM having addressable pixel elements. Details of a suitable SLIM 16 are set out in U.S. Pat. No. 4,956,619, entitled "Spatial Light Modulator", which is assigned to Texas Instruments Incorporated, and incorporated by reference herein.

Display unit 17 has optical components for receiving the image from SLM 16 and for illuminating an image plane such as a display screen. For color displays, the bit-planes for each color could be sequenced and synchronized to a color wheel that is part of display unit 17. Or, the data for different colors could be concurrently displayed on three SLMs and combined by display unit 17. Master timing unit 18 provides various system control functions.

A comprehensive description of a DMD-based digital display system is set out in U.S. Pat. No. 5,079,544, entitled "Standard Independent Digitized Video System", and in U.S. patent application Ser. No. 08/147,249, entitled "Digital Television System", and in U.S. patent Ser. No. 08/146,385, entitled "DMD Display System", each assigned to Texas Instruments Incorporated, and each incorporated by reference herein. U.S. patent Ser. No. 07/678,761, entitled "DMD Architecture and Timing for Use in a Pulse-Width Modulated Display System", describes a method a formatting video data for use with a DMD-based display system and a method of modulating bit-planes of data to provide varying pixel brightness. The general use of a DMD-based display system with a color wheel to provide sequential color images is described in U.S. Pat. No. 5,233,385, entitled "White Light Enhanced Color Field Sequential Projection". These patent applications are assigned to Texas Instruments Incorporated, and are incorporated herein by reference.

Figure 3:
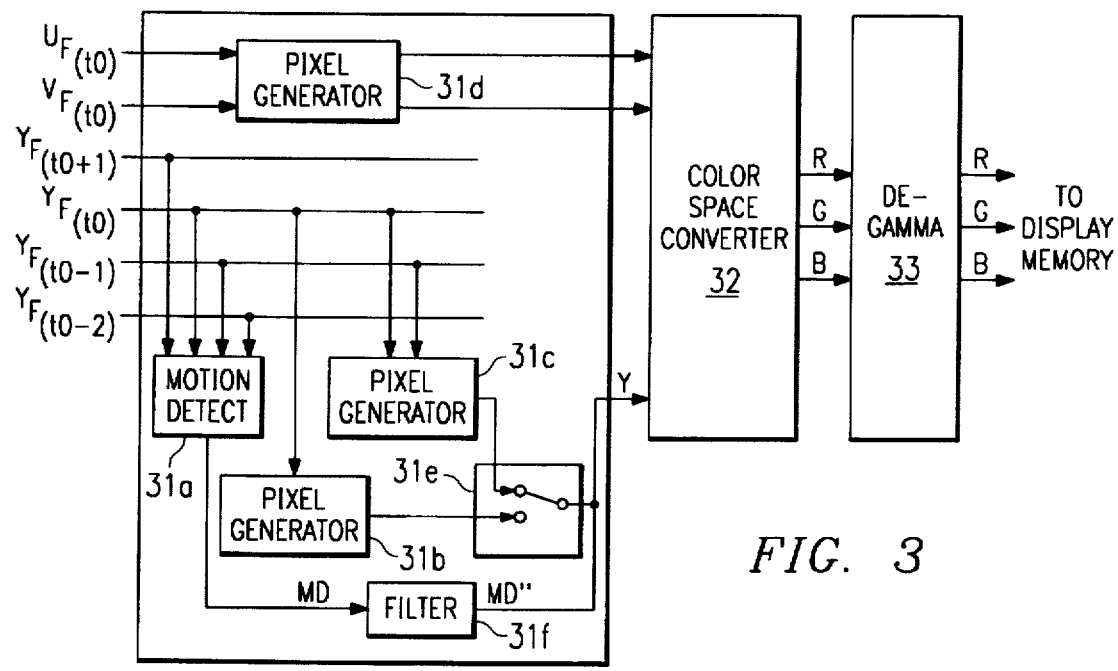
FIG. 3 illustrates line generator, colorspace converter, and de-gamma processors, such as might be part of the processing system of FIGS. 1 and 2.

FIG. 3 illustrates processing system 14 as three separate processors, each of which perform a distinct task. These processors include line generator 31, colorspace converter 32, and de-gamma corrector 33. As explained in further detail below, in the de-interlacing example of this description, line generator 31 produces 480-line display frames from 240-line fields. Colorspace converter 31 converts data that is not already in RGB (red, green, blue) format to RGB data. De-gamma processor 33 undoes the effects of gamma-correction, because the linear properties of SLM 16 eliminate the need for gamma-correction.

Both colorspace converter 32 and de-gamma corrector 33 may be implemented as look-up tables with a memory device, such as a read only memory. Further details about the structure and operation of various implementations of colorspace converter 32 and de-gamma corrector 33 are set out in U.S. patent Ser. No. 08/178,975, entitled "Linearization for Video Display System with Spatial Light Modulator", assigned to Texas Instruments Incorporated, and incorporated herein by reference. U.S. patent Ser. No. 08/147,249, incorporated by reference above, also describes various colorspace convertors and de-gamma correctors.

Line generator 31 has a motion detector 31a and at least two different types of pixel generators 31b and 31c. As explained below, the basic function of motion detector 31a is to provide a control signal that determines which output pixel data, or combination of output pixel data, from pixel generators 31b and 31c, will be used to generate display frames.

The input to motion detector 31a is Y data from four different fields. Y data from one field, $Y_{F(t0+1)}$, is delivered directly to motion detector 31a. Data from three other fields, $Y_{F(t0)}$, $Y_{F(t0-1)}$, and $Y_{F(t0-2)}$, are delivered to motion detector 31a from field buffer 13. The field designated with the subscript F(t0+1) is a "future" field in the sense that it arrives at display system 10 temporally spaced one field behind the "current" field, i.e., the field whose pixel data is currently being converted to pixel data for a display frame. The field designated with the subscript F(t0) is the current field. The fields designated with the subscripts F(t0−1) and F(t0−2) are a previous field and a second previous field, respectively.

A feature of the invention is that, for any pixel of a current field, motion detector 31a generates a motion detection signal based on data from four fields: the future field, the current field, the previous field, and the second previous field. The process selects two or more neighboring pixels of the pixel in question. It then calculates field-to-field differences between values of these pixels, using different fields for different pixels. Finally, it calculates a weighted average of these differences.

The motion detection signal may be re-calculated continuously on a pixel-by-pixel basis. The pixel data of each field is analyzed for motion, and used to create additional pixel data for a display frame.

In FIG. 3, motion detector 31a, and pixel generators 31b and 31c operate on only the luminance (Y) pixel data of a luminance/chrominace input signal. The pixel data for the chrominace (UV) data can be handled in a number of different ways. In the example of FIG. 3, the UV data is processed by a pixel generator 31d that uses a line doubling method for all UV data. It is also possible to duplicate pixel generators 31b and 31c for the chrominance data so that the pixel generation method for chrominance data is switched in response to the motion detection signal output by motion detector 31a. Finally, a separate motion detector could be provided for chrominance data, as well as separate pixel generators, so that the same process of detecting motion and selecting pixel generation methods would be performed on chrominance data as is performed on the luminance data.

It is also possible that the incoming signal might already represent an RGB colorspace. In this case, color conversion is not necessary. A motion detector 31a and pixel generators 31b and 31c would be on the data path of each of the three colors.

Figure 4:
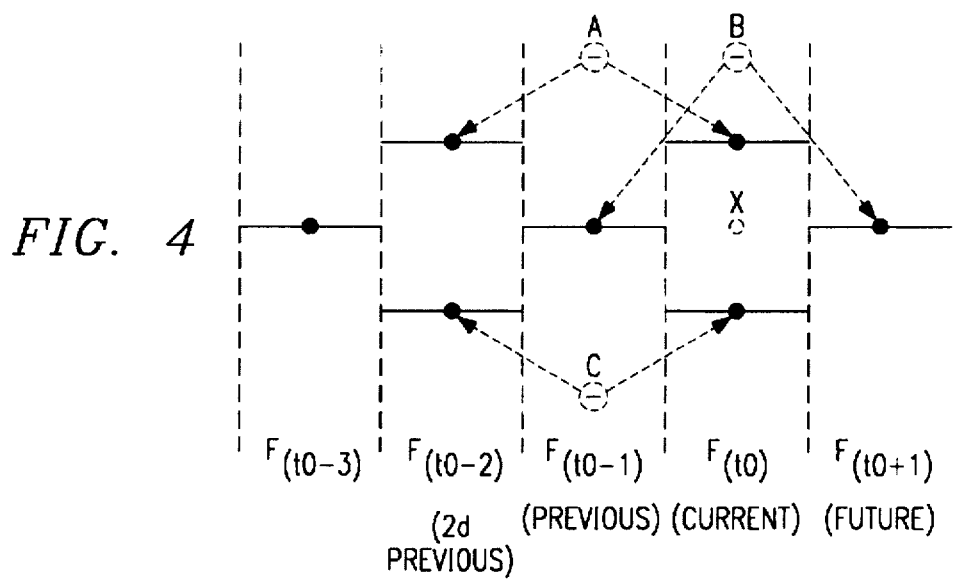
FIG. 4 illustrates a method of detecting whether there is motion in the image represented by adjacent fields of a video signal.

FIG. 4 illustrates one example of generating a motion detect signal in accordance with the invention. This method is used to detect motion between interlaced fields of pixel data sampled from an NTSC signal. It uses pixel difference values from three neighboring pixels.

The pixel whose motion is being detected is pixel X in the current field. The motion detection process may be expressed mathematically as:

$$MD = \frac{A_{F(t0)} - A_{F(t0-2)}}{4} + \frac{C_{F(t0)} - C_{F(t0-2)}}{4} + \frac{B_{F(t0+1)} - B_{F(t0-1)}}{2}$$

, where the numerator of the first term represents the difference of values of the pixel above pixel X in the current field and the second previous field, the numerator of the second term represents the difference of values of the pixel on the same line as pixel X in the future field and the previous field, and the numerator of the third term represents the difference of values of the pixel below pixel X in the future field and the previous field. The result of the calculations is a motion detect value, MD, having a value with the same range as that of the pixel data, here, 8 bits.

A similar method could be used with two neighboring pixels or with more than two neighboring pixels. The number of terms and the value of the denominators would be adjusted accordingly.

Motion detector 31a may be implemented as a processor that executes a set of stored instructions. An example of a suitable processor is the Scanline Video Processor manufactured by Texas Instruments Incorporated. The instructions may be stored in a program memory, such as a read only memory, that is part of motion detection processor 31a.

Referring again to FIG. 3, the motion detection signal, which may represent a series of MD values or a series of values derived from MD values, is used to select between the outputs of two pixel generators 31b and 31c. As explained below in connection with FIGS. 5–10, one of these pixel generators, 31b, generates pixel data more suited for display when the image represented by the current field has no motion. The other pixel generator, 31c, generates pixel data more suited for display when the image represented by the current field is in motion. A selector 31e provides the switching function, and as explained below in connection with FIGS. 9 and 10, selector 31e might also provide a weighted average of the outputs.

Line generator 31 may also include a filter 31f, which is used to reduce the effects of noise on the motion detection signal, MD. This filtering may be performed in the horizontal or vertical planes, or both.

For vertical filtering, a process that models a low pass filter is used. For example, where filter 31f is a 5-tap low pass filter, the following calculation may be performed:

$$MD' = \tfrac{1}{4}H^{-2} + \tfrac{1}{2}H^{-1} + \tfrac{1}{2} + \tfrac{1}{2}H + \tfrac{1}{4}H^2 \; * \; MD.$$

In accordance with the above calculation, MD' is a weighted average of the value of the current pixel, the two pixels above it in the same field, and the two pixels below it in the same field.

The output of the vertical filter can be provided to a horizontal filter. For example, where filter 31f is a 9-tap horizontal low pass filter, the following calculation may be performed:

$$MD'' = \tfrac{1}{8}(T^{-1} + T)(T^{-2} + T^2)(T^{-1} + 1)(1 + T) * MD'$$

In accordance with the above calculation, MD" is a weighted average of the values of the current pixel, the four pixels to the right in the same line, and the four pixels to the left in the same line, all pixels being in the same field.

Other filtering can be performed to reduce the effects of noise. A constant may be subtracted from the filtered or unfiltered value of MD, and the result compressed to a value having fewer bits.

In the example of this description, each MD value is compressed to 4 bits, and the motion detection signal is a series of 4-bit values. The motion detection signal might represent "low motion" or "motion" below and above a predetermined threshold. This would permit selection between outputs as an "either/or" selection, in which the pixel data from pixel generator 31b or 31c is used. Or, as explained below, the motion detection signal can be used to derive a weighing factor. The selection can be switched, or the weighing factor can be adjusted, as frequently as every pixel.

Pixel generators 31b and 31c generate new pixels for each current field. As stated above in connection with FIG. 3, in the example of this description, where the incoming data is in a luminance-chrominance (YUV) colorspace, only the Y data of each pixel is used to create new Y values. Additional chrominance values are generated by a separate pixel generator 31d.

Examples of a pixel generator 31b whose output is suitable to create pixel data from low motion fields include those that use pixel data that is spaced temporally. More specifically, such pixel generators 31b are implemented with processes that calculate new pixel values from values of neighboring pixels in adjacent and near adjacent fields.

Figure 5:
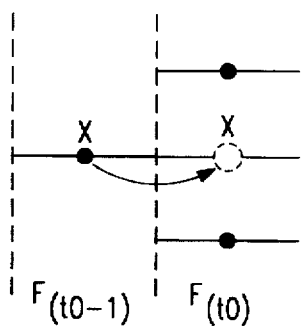
FIGS. 5–9 illustrate various pixel generation methods.

FIG. 5 illustrates one such "low motion" line generation method. This is a "field insert" method, in which the value for the new pixel, X, is the same as the value for the same pixel in an adjacent (future or previous) field. Expressed mathematically and using the previous field value:

$$X_{F(0)} = X_{F(0-1)}$$

A variation of this method would be using the average value of the same pixel in the previous and the future field.

Figure 6:
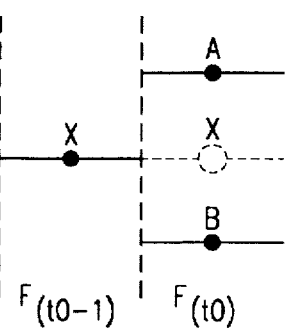

FIG. 6 illustrates another "low motion" method, which is a "median value" method. The value for the new pixel, X, is the median value of pixel X in the previous field or neighboring pixels in the same field. Expressed mathematically and using two neighboring pixels:

$$X_{F(0)} = \text{Median}\,(X_{F(0-1)}, A_{F(0)}, B_{F(0)})$$

Pixel generators 31c whose output is suitable to create pixel data from motion fields typically calculate new pixel values from values of pixels in the same field. This is because using pixel values from temporally spaced fields tends to result in a smeared display image.

Figure 7:
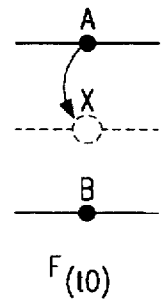

FIG. 7 illustrates a "motion" line generation method. This is a line doubling method, in which the value for the new pixel, X, is the same as the value of the pixel above or below it in the current field. Expressed mathematically and using the pixel above.

$$X_{F(0)} = A_{F(0)}$$

Figure 8:
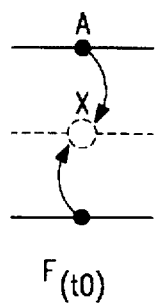

FIG. 8 illustrates a line averaging method, in which the value for the new pixel, X, is the average value of the pixels above and below it. Expressed mathematically:

$$X_{F(0)} = \frac{A_{F(0)} + B_{F(0)}}{2}.$$

As an alternative to switching between two different outputs of pixel generators 31b and 31c, the motion detection signal can be used to derive a weighing factor, which is used to provide a weighted average of outputs.

Figure 9:
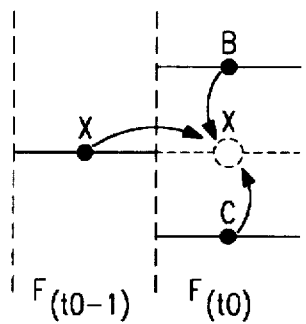

FIG. 9 illustrates an example of using the motion detection signal to provide a weighted average. The process determines the new pixel value, X, for the current field, based on pixels A and B in adjacent lines of the same field, and on the value for pixel X in an adjacent field. Expressed mathematically and using a previous field value for X:

$$X_{F(i)} = \frac{k(B_{F(i)} + C_{F(i)}) + (1-k)X_{F(i-1)}}{2}$$

, where the first term represents a line averaging process and the second term represents a field insert process. The weighing factor, k, is a normalized value derived from the motion detection value. For example, where the motion detect value is a 4-bit value (0–15), k might be calculated as:

$$k = MD/16$$

In the examples of FIGS. 5–9, pixel generators 31b and 31c use interlaced field data to generate display frames. For example, in an NTSC signal, where alternating fields have 240 odd rows or 240 even rows, pixel generators 31b and 31c generate an additional 240 rows per frame, so that each display frame has 480 rows. This type of line generation is commonly referred to as "proscan" conversion or "de-interlacing". However, it should be understood that line generator 31 could be used to process any type of data, interlaced or non-interlaced, so that the display frames have additional lines of data.

Regardless of whether pixel generation is for de-interlacing or for some other type of image enhancement, a number of new pixels can be generated for each current field. The result will be a display frame having the generated pixel data. Likewise, as each new field becomes the new current field, a display frame will be generated from the pixel data of that field in a similar manner. Because motion detector 31a uses the future field to determine motion, the generated frame is delayed by one field period from the incoming field.

Pixel generators 31b and 31c may be implemented as processors that are programmed to execute the methods described above. Like motion detector 31a, each processor includes a memory for storing the instructions for performing at least one of the methods. Pixel generators 31b and 31c might also be implemented as logic circuits that perform a pixel generation algorithm.

Figure 10:
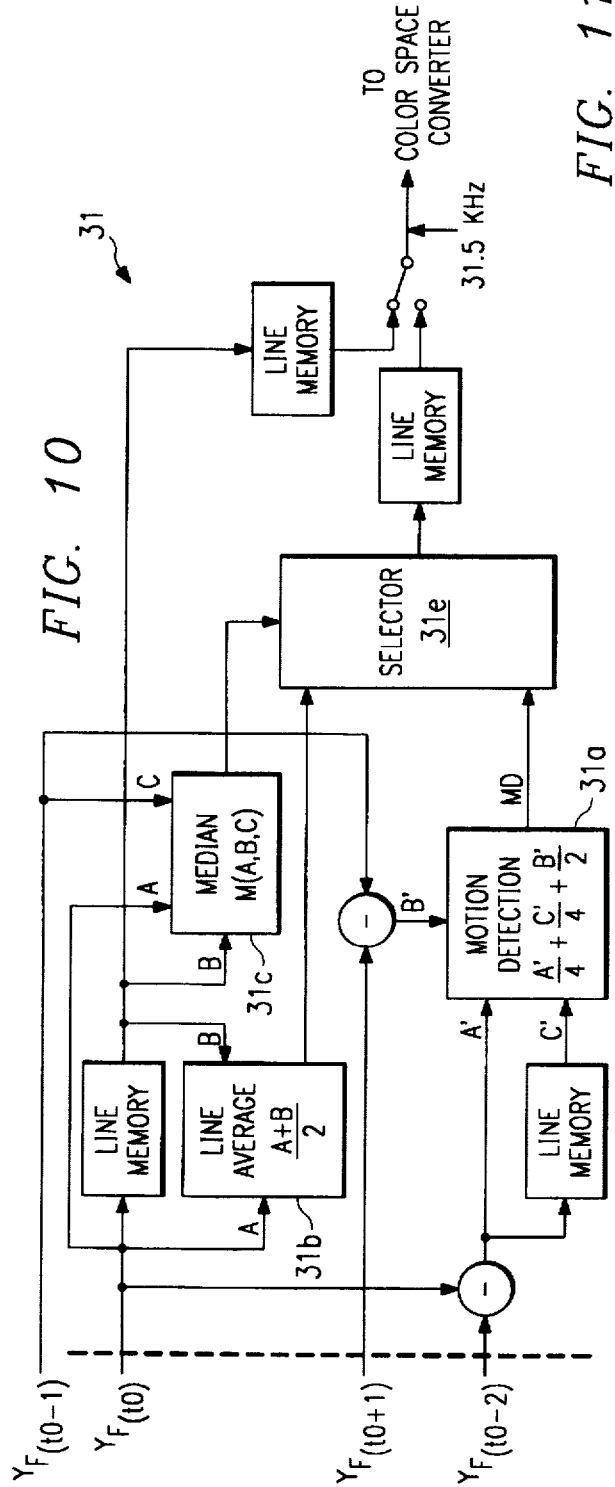
FIG. 10 is a block diagram of a specific embodiment of the line generation processor of FIG. 3.

FIG. 10 illustrates a specific embodiment of a motion adaptive line generation generator 31. Like the other examples of this description, an interlaced input signal is assumed. Pixel generators 31b and 31c are implemented with line averaging and median processors, respectively. As explained above, line averaging is preferable when the image is in motion, and median processing is preferable when the image is not in motion. The motion detector 31a calculates a motion detection signal in accordance with the method of FIG. 4. Line memories are used to provide values of pixels in the same field but on different lines.

Selector 31e receives the motion detect signal and the outputs of both pixel generators 31b and 31c. In accordance with the a method similar to that described in connection with FIG. 9, it computes a weighing factor and calculates a weighted average of outputs. The result is a line of generated pixel data.

The original line from the current field is alternated with the generated line to produce a display frame. The switching between the original line and the generated line occurs at a 31.5 Khz rate appropriate for an NTSC display.

Referring again to FIG. 3, pixel data that is fully processed is formatted into bit-planes by display memory 15. As stated above, in the example of this description, each display frame has 640×480 samples of pixel data, and each sample has 24 bits. The formatting creates 24 bit-planes per frame, each bit-plane comprised of one bit of the same weight from each sample. Thus, each display frame has 24 bit-planes of 640×480 bits each. Further details of the formatting process are described below in connection with FIGS. 11–14.

Formatting

Figure 11:
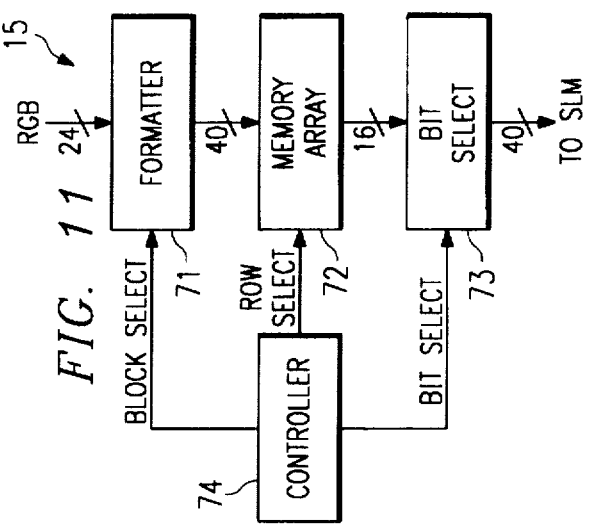

FIG. 11 illustrates one example of a display memory 15 that implements the formatting and display frame storage function. Display memory 15 is comprised essentially of a formatter 71, a memory array 72, a bit selector 73, and a controller 74.

FIG. 11 assumes a non-partitioned memory, where memory 15 stores data for all rows. In a partitioned memory, memory 15 might store data for only the top or bottom half of SLM 16, and a second memory 15 would store data for the other half. The principles of the invention would be the same for a partitioned memory, except that each partition would operate in parallel.

Incoming pixel data is written to memory 15 sample-by-sample, row-by-row, frame-by-frame. Thus, the incoming data samples are 24 bits wide, 8 bits for each color. Formatter 71 re-arranges this data into bit-level data.

FIG. 12 illustrates one embodiment of formatter 71. Each row of data (640 pixel samples) is divided into 40 blocks of 16 samples each (40×16=640) Each of the 40 blocks has a block register 81. Each block register 81 receives one block of data. Because each sample is 24 bits, the capacity of each block register 81 is 384 bits (24×16=384). After the first block register 81 has been filled with data for the first sixteen samples, controller 74 addresses the next block register 81, which stores the data for the next sixteen samples. This process continues until each block register 81 has been filled with data for 16 samples, and hence the 40 block registers 81 store the data for one row.

A multiplexer 82 associated with each block register 81 receives the data from that block register 81. Each multiplexer 82 outputs its data, one bit at a time, to memory array 72.

As illustrated in FIG. 13, memory array 72 has 40 columns, one column for each block register 81 of formatter 71. Each column stores data for 16 pixels of 480 rows. Each column is further divided into bit-plane areas 91, for storing bit-levels of the 16 pixels and 480 rows of that column. Thus, each column has 24 bit-plane areas 91, one for each bit-level. Each area 91 stores 7680 bits (1 bit per pixel×16 pixels×480 rows=7680 bits). Across the 40 columns of array 72, the 24 bit-planes that comprise one display frame are stored.

Referring again to FIG. 11, the data moves from array 72 into bit selector 73. As compared to the data into formatter 71, the data into bit selector 73 arrives in bit-level order.

FIG. 14 illustrates bit selector 73 in further detail. Bit selector 73 has 40 columns, one associated with each column of array 72. Each column has a first shift register 101, which receives 256 bits of data (1 bit×16 pixels×16 rows=256 bits) from a bit-plane area 81 of array 72. These 256 bits are of the same bit level but from different rows, such that across the 40 columns of bit selector 73, the shift registers 101 store one level of bit-plane data for 16 rows. A second shift register 102 in each column selects every 16th bit so that the data delivered to SLM 16 is in bit-planes, row-by-row. Each of the 40 columns delivers 1 bit at a time to SLM 16.

Referring again to FIG. 11, controller 74 provides block addresses, row addresses, and bit-plane addresses for formatter 71, array 72, and bit selector 73, respectively. These addresses may be generated internally with counters, or provided externally by processor 14 or by timing unit 18. Another function of controller 74 is to resolve conflicts if access to the same data for reading and writing is attempted.

This may be accomplished with techniques known in the art of memory management, especially for the case of dual ported memories.

The display memory 15 described in connection with FIGS. 11–14 is only one example of a display memory 15 for formatting and storing display frames. Further details are set out in U.S. patent Ser. No. 755,981, entitled "Data Formatter with Orthogonal Input/Output and Spatial Reordering", assigned to Texas Instruments Incorporated, and incorporated by reference herein. Other types of display memories 15 may use other means for formatting the data into bit-planes. U.S. patent Ser. No. (Atty Dkt No. TI-17404), entitled "Digital Memory for Display System Using Spatial Light Modulator", assigned to Texas Instruments Incorporated, and incorporated by reference herein, describes a display memory 15 that stores data in pixel format and has a means for formatting the data into bit-planes on output.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A line generator for a digital display system that receives fields of pixel data representing a video input signal and displays frames that have more lines than said fields, comprising:

a motion detector for executing a set of motion detection instructions, said motion detection instructions including instructions for selecting at least one neighboring pixel of a current pixel, calculating a difference between values of said neighboring pixel in said current field and a second previous field relative to said current field, calculating a difference between values of said current pixel in a future field relative to said current field and a previous field relative to said current field, and calculating a weighted average of said differences, thereby obtaining a motion value;

a first pixel generator for generating new pixel values from pixel data of said current field;

a second pixel generator for generating new pixel values from pixel data of at least one temporally adjacent field; and a selector for selecting between outputs of said first pixel generator and said second pixel generator, in response to a motion value.

2. The line generator of claim 1, wherein said at least one neighboring pixel is the pixel above or below said current pixel.

3. The line generator of claim 1, wherein said at least one neighboring pixel are the pixel values above and below said current pixel, and wherein a difference between a value of said neighboring pixel in said current field and a second previous field relative to said current field is calculated for both pixels.

4. The line generator of claim 1, wherein said motion detector and said first pixel generator and second pixel generator operate on luminance data, and further comprising a third pixel generator for generating new lines of chrominance data.

5. The line generator of claim 1, further comprising line memories for storing lines of pixel data from the same field.

6. The line generator of claim 1, further comprising a motion analyzer for providing a weighing factor for selecting between the outputs of said first pixel generator and said second pixel generator processor.

7. The line generator of claim 1, further comprising a filter for filtering said motion values.

8. The line generator of claim 1, wherein said first pixel generator and said second pixel generator are processors programmed to perform pixel generation processes.

9. The line generator of claim 1, wherein said selector is a switch for selecting the output of said first pixel generator or said second pixel generator.

10. The line generator of claim 1, wherein said selector is a motion analyzer for calculating a weighing factor for providing a weighted average of the output of said first pixel generator and said second pixel generator.

11. A method of generating lines of pixel data sampled from fields of pixel data representing a video input signal, comprising the steps of:

generating a motion detection signal by selecting at least one neighboring pixel of a current pixel, calculating a difference between values of said neighboring pixel in said current field and a second previous field relative to said current field, calculating a difference between values of said current pixel in a future field relative to said current field and a previous field relative to said current field, and calculating a weighted average of said differences;

generating a first pixel data output using pixel data from the current field;

generating a second pixel data output using pixel data from at least one temporally adjacent field; and selecting between said first pixel data output and said second pixel data output, in response to the value of said motion detection signal.

12. The method of claim 11, wherein said generating step is performed for every pixel of a current field of pixel data.

13. The method of claim 11, wherein said generating step is repeated for a number of current pixels and said motion detection signal is a series of digital values.

14. The method of claim 11, wherein said motion detection signal is used to derive a weighing factor and wherein said selecting step is performed by selecting weighted outputs of said pixel data outputs.

15. The method of claim 11, wherein said at least one neighboring pixel is the pixel above or below said current pixel.

16. The method of claim 11, wherein said at least one neighboring pixel are the pixel values above and below said current pixel, and wherein a difference between a value of said neighboring pixel in said current field and a second previous field relative to said current field is calculated for both pixels.

17. The method of claim 11, further comprising the step of filtering said motion detection signal.

18. A line generator for a digital display system that receives interlaced fields of pixel data representing a video input signal and displays de-interlaced frames represented by pixel data, comprising:

a motion detector for executing a set of motion detection instructions, and having a memory for storing said instructions, said motion detection instructions including instructions for selecting at least one neighboring pixel of a current pixel, calculating a difference between values of said neighboring pixel in said current field and a second previous field relative to said current field, calculating a difference between values of said current pixel in a future field relative to said current field and a previous field relative to said current field, and calculating a weighted average of said differences, thereby obtaining a motion value for some number of current pixels of each current field;

a first pixel generator for generating new pixel values from pixel data of said current field, in response to said motion value;

a second pixel generator for generating new pixel values from pixel data of at least one temporally adjacent field, in response to said motion value;

a selector for selecting between outputs of said first pixel generator and said second pixel generator in response to a motion value, thereby providing a line of generated pixel data; and a line switch for switching between an original line of said input signal and said line of generated pixel data.

19. The line generator of claim 18, wherein said at least one neighboring pixel is the pixel above or below said current pixel.

20. The line generator of claim 18, wherein said at least one neighboring pixel are the pixel values above and below said current pixel, and wherein a difference between a value of said neighboring pixel in said current field and a second previous field relative to said current field is calculated for both pixels.

* * * * *